Aug. 25, 1925. 1,551,335

E. F. SHERWOOD

SEED AND FERTILIZER PLANTER

Filed June 29, 1923 2 Sheets-Sheet 1

Inventor:
E. F. SHERWOOD,
By W. T. FitzGerald & Co.
Attorney.

Aug. 25, 1925.  E. F. SHERWOOD  1,551,335

SEED AND FERTILIZER PLANTER

Filed June 29, 1923  2 Sheets-Sheet 2

Inventor:
E. F. SHERWOOD,
By W. J. FitzGerald & Co.
Attorney.

Patented Aug. 25, 1925.

1,551,335

UNITED STATES PATENT OFFICE.

ERNEST F. SHERWOOD, OF KALKASKA, MICHIGAN.

SEED AND FERTILIZER PLANTER.

Application filed June 29, 1923. Serial No. 648,479.

*To all whom it may concern:*

Be it known that I, ERNEST F. SHERWOOD, a citizen of the United States, residing at Kalkaska, in the county of Kalkaska and State of Michigan, have invented certain new and useful Improvements in a Seed and Fertilizer Planter; and I do hereby declare the following to be a full, clear, and exact description of the invention, such as will enable others skilled in the art to which it appertains to make and use the same.

The present invention relates to seed planters and fertilizer droppers, and aims to combine in a hand operated device, in a novel manner, a seed planter and fertilizer dropper.

Another object is to combine a seed planter and fertilizer dropper in such a manner that the fertilizer will be deposited at the bottom of the hole or opening made in the ground, with the seed above or on the fertilizer, in order that the fertilizer will give the plants a good start, as well as assisting in the germination of the seed.

A further object is the provision of a novel combination of shovels or blades to enter the ground and for dropping the fertilizer and seed so that the fertilizer will be below the seed.

A still further object is the provision of novel means for actuating the shovels and the seed and fertilizer dropping means.

Another object is to improve the fertilizer dropping means so as to regulate the amounts of fertilizer discharged and to agitate the fertilizer so as to assure of the discharge thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
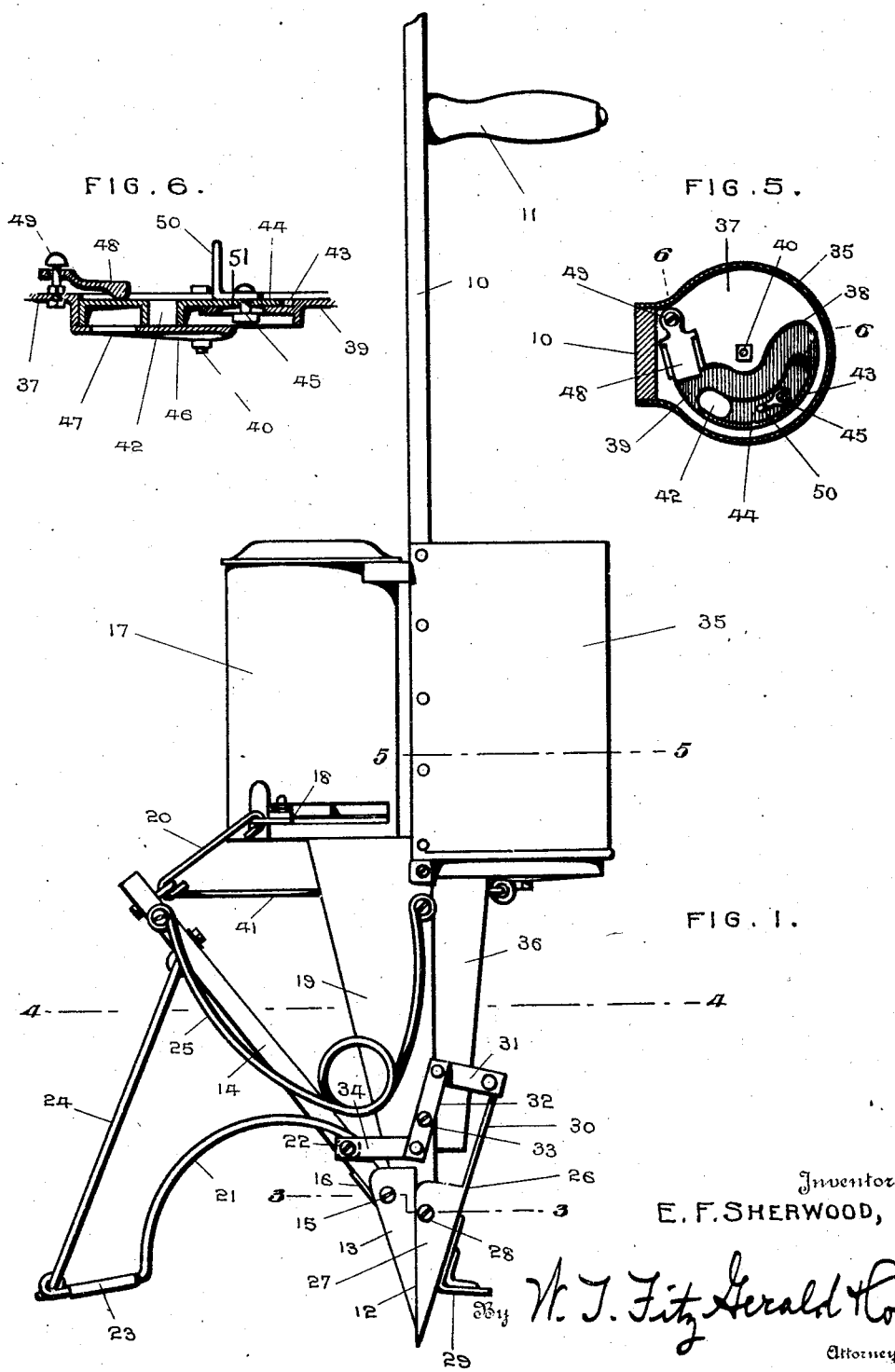
Figure 1 is a side elevation of the improved device with the parts thereof in normal position.
Figure 4:
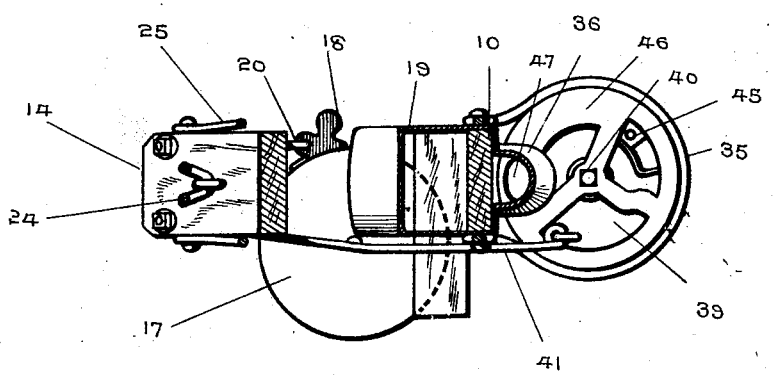
Figure 3:
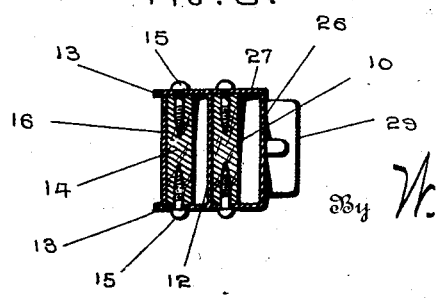

Figs. 3, 4 and 5 are sections on the respective lines 3—3, 4—4 and 5—5 of Fig. 1.

Fig. 6 is a sectional view on the line 6—6 of Fig. 5.

The frame or body of the device comprises a vertical bar 10 having a handle 11 near its upper end for carrying the device and forcing the shovels into the ground. An intermediate shovel 12 is secured to the lower end portion of the bar 10, and has the side flanges 13 between which the lower end of an inclined lever 14 is pivoted or fulcrumed by means of screws 15 extending through the flanges 13 into the lever 14. The bar 10 and lever 14 are preferably of wood, and a shovel 16 is secured to the lower end portion of the lever 14 to swing between the flanges 13 against the shovel 12, the lower end of the shovel 16 terminating short of the lower end of the shovel 12.

A receptacle 17 for the corn or other seed to be planted, is secured to the bar 10 at one side thereof, and has seed dropping means 18 of any suitable or well known kind at the bottom thereof, for dropping the seed down through a chute or boot 19 secured to the same side of the bar 10 and extending from the bottom of the receptacle 17 to a point slightly above the pocket or space between the shovels 12 and 16, in order that the seed will drop into said space. The seed dropping means 18 is connected by a link 20 with the lever 14, to be oscillated by the movement of said lever toward and away from the bar 10.

In order to operate the lever 14, a wire arm 21 is pivotally connected with the lever 14 near the pivot screws 15 of said lever, by means of pivot screws 22, and said lever 21 has a foot 23 or presser plate to bear on the ground. The lever 14 and arm 21 are connected by a link 24, and the lever 14 is swung away from the bar 10 by means of the springs 25 having their terminals secured to the opposite edges of the bar 10 and lever 14.

As so far described, the device resembles a seed planter as already on the market and in use, and there is combined therewith means for dropping fertilizer, as will presently appear.

A shovel 26 is disposed at that side of the shovel 12 and bar 10 opposite to the short shovel 16, and has the side flanges 27 overlapping and pivoted, by means of screws 28, to the edges of the bar 10. The edges of the flanges 27 are arranged to overlap the shovel 12, and the lower end of the shovel 12 projects beyond the lower end of the shovel 16, while the lower end of the shovel 26 projects beyond the shovel 12, as clearly seen in Fig. 2. The shovel 16, when closed, contacts with the shovel 12 between the flanges 13, and when the shovel 26 is closed, the lower end of the shovel 12 contacts with the shovel 26 between the flanges 27, whereby the three shovels converge downwardly to provide a sharp nose to enter the ground. The shovel 26 carries a gage 29 to come into contact with and bear on the ground, for limiting the entrance of the shovels into the ground, so as to regulate the depth to which the seed is planted. Said shovel 26 also has an upwardly extending arm 30 for swinging the shovel 26 open and closed.

The arm 30 is operatively connected with the lever 14, so that both shovels 16 and 26 are opened and closed simultaneously. Thus, the arm 30 is connected by links 31 with levers 32 fulcrumed, by means of screws 33, to the opposite edges of the bar 10, and the other arms of the levers 32 are connected by links 34 with the pivot screws 22. Thus, when the lever 14 is swung toward the bar 10 to open the shovel 16, the links 34 swing the levers 32 and pull the links 31 so as to swing the arm 30 toward the bar 10 to open the shovel 26. Both shovels 16 and 26 are thus opened and closed at the same time.

The fertilizer is contained within a receptacle 35 secured to the bar 10 at that side opposite to the seed receptacle 17, and a chute or boot 36 is secured to the bar 10 opposite to the chute 19 and extends from the bottom of the receptacle 35 behind the arm 30 of the shovel 26, so that the fertilizer which is dropped from the receptacle 35 passes down through the chute 36 between the shovels 16 and 26.

The receptacle 35 has a bottom 37 with an opening 38, and an oscillatory valve disk 39 is disposed under the bottom 37 across the opening 38, and is pivoted centrally to the bottom 37 by means of the pivot bolt 40. The disk 39 is connected by a link 41 with the lever 14, so that the seed and fertilizer dropping means are both operated from the lever 14, the disk 39 being oscillated by the lever 14. The disk 39 has on opening 42 for receiving a charge of fertilizer, and the disk has an arcuate slot or groove 43 extending from said opening in which an arcuate adjusting member 44 is disposed, said member 44 being clamped to the disk 39 by means of a bolt 45 extending through the member 44 and through a slot 51 in the disk 39. By loosening the bolt 45, the member 44 can be adjusted to regulate the size of the opening 42, so as to determine the amount of fertilizer dropped for each operation of the planter. The bottom 37 of the receptacle 35 has a portion 46 under the opening 42 to close said opening and retain the fertilizer therein until the disk 39 is turned to discharging position, so that the opening 42 registers with an opening 47 in the portion 46. A piece 48 loosely engages the screw or post 49 carried by the bottom 37 and covers the opening 42 when said opening is over the opening 47, to prevent the fertilizer from dropping through both openings from within the receptacle. The piece 48 is free for upward movement and is intended especially to enable the fertilizer dropper to be used for a secondary seed planter, inasmuch as the piece 48 can swing upwardly when the seed in the opening 42 project upwardly above the disk 39. In the event that the fertilizer dropper is used as a secondary seed planter, for planting two different kinds of seed, instead of planting seed with fertilizer, the seed in being carried with the disk 39 in the opening 42 under the piece 48 will result in the piece 48 yielding or swinging upwardly should the seed project upwardly out of the opening 42 when the seed is moved over the opening 47 to discharge down through the chute 36.

In order to keep the fertilizer, which is of powdered form, agitated above the opening 42, an upwardly projecting finger 50 is carried by the disk 39, being secured in place by the bolt 45. The finger 50 is disposed in rear of the opening 42, and will agitate and loosen the fertilizer so as to prevent it from packing above the opening 42, thus assuring of the fertilizer dropping into said opening 42 when said opening is moved from under the piece or flap 48.

Figure 2:
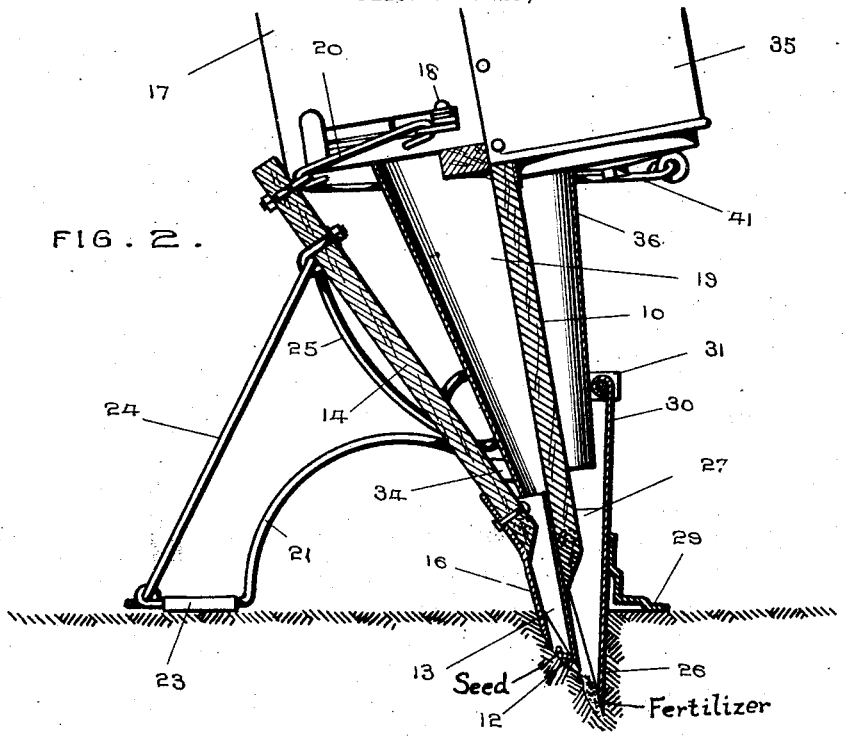
Fig. 2 is a sectional view of the lower portion of the device, showing the shovels forced into the ground and opened, to drop the fertilizer and seed.

The device is used in the same manner as an ordinary hand-operated seed planter. The shovels are forced into the ground, the gage 29 limiting the depth to which the shovels enter the ground, and the bar 10 is then moved or swung to the left, as seen in Figs. 1 and 2, so that the foot or plate 23 bears on the ground, thereby stopping the movement of the lever 14, while the movement of the bar 10 is continued, so that the bar 10 and lever 14 are moved or swung toward one another. This relative movement of the bar 10 and lever 14 will swing the parts to the position as seen in Fig. 2, the shovels 16 and 26 being swung open, and the seed and fertilizer dropping means being actuated to drop the seed and fertilizer down through the respective chutes 19 and 36. The fertilizer drops between the shovels 12 and 26, while the seed drops between the shovels 16 and 12. The opening movement of the shovels will form an opening or hole in the ground, and the fertilizer shovel 26 projecting lower down will open the ground beyond the lower end of the shovel 12 to receive the fertilizer, as seen in Fig. 2, so that the seed will be dropped between the shovels 12 and 16 above the fertilizer. This will place the fertilizer in the ground below the seed, to assist in the germination of the seed and to give the plants a good start. Then, the device is raised from the ground to withdraw the shovels from the ground, which will let the seed come to rest on the fertilizer, and the hole or opening in the ground is then pressed closed by the foot or otherwise.

As hereinbefore intimated, instead of dropping fertilizer from the receptacle 35, it is possible to use the device for planting two different kinds of seed at the same time, the fertilizer dropper being used as a secondary seed planter.

Having thus described the invention, what is claimed as new is:—

1. A planter comprising a bar adapted to be manipulated by hand, an intermediate shovel secured to said bar, two side shovels connected with said intermediate shovel and bar and located at opposite sides of said intermediate shovel to swing open and closed with reference to said intermediate shovel, receptacles for different materials carried by said bar and having means for dropping small quantities of the materials between the shovels at opposite sides of the intermediate shovel, operating means connected with the side shovels for simultaneously swinging the side shovels away from and toward the intermediate shovel, and an operative connection between said operating means and said dropping means for operating the dropping means of both receptacles simultaneously with the movement of the side shovels away from the intermediate shovel.

2. A planter of the character described comprising a bar, an intermediate shovel secured to said bar, two side shovels pivotally connected with said shovel and bar and located at opposite sides of said intermediate shovel to swing open and closed with reference to said intermediate shovel, a lever pivotally connected with said bar and connected to said side shovels for causing one side shovel to swing simultaneously away from and toward the intermediate shovel with the other side shovel, and means for swinging the last-named side shovel away from and toward the intermediate shovel.

3. A planter of the character described comprising a bar, an intermediate shovel secured to said bar, two side shovels pivotally connected with said shovel and bar and located at opposite sides of said intermediate shovel to swing open and closed with reference to said intermediate shovel, operating means for swinging one of said side shovels away from and toward the intermediate shovel, and means for causing the other side shovel to move simultaneously toward and away from the intermediate shovel with the first-named side shovel including a lever pivotally connected between its ends with said bar and links connecting the opposite arms of said lever with said side shovels.

4. A planter of the character described comprising a bar, an intermediate shovel secured to said bar, two side shovels pivotally connected with said shovel and bar and located at opposite sides of said intermediate shovel to swing open and closed with reference to said intermediate shovel, a lever connected to one of the side shovels to swing said shovel away from and toward the intermediate shovel, an operative connection between the side shovels for causing the other side shovel to swing away from and toward the intermediate shovel simultaneously with the first-named side shovel, receptacles for different materials carried by said bar and having means for dropping quantities of the materials between the shovels at opposite sides of the intermediate shovel, and an operative connection between said lever and said dropping means.

In testimony whereof I have signed my name to this specification.

ERNEST F. SHERWOOD.